Dec. 2, 1924.
W. J. BOYLE ET AL
1,517,530
BUNGHOLE CONSTRUCTION FOR OIL BARRELS
Filed March 23, 1921
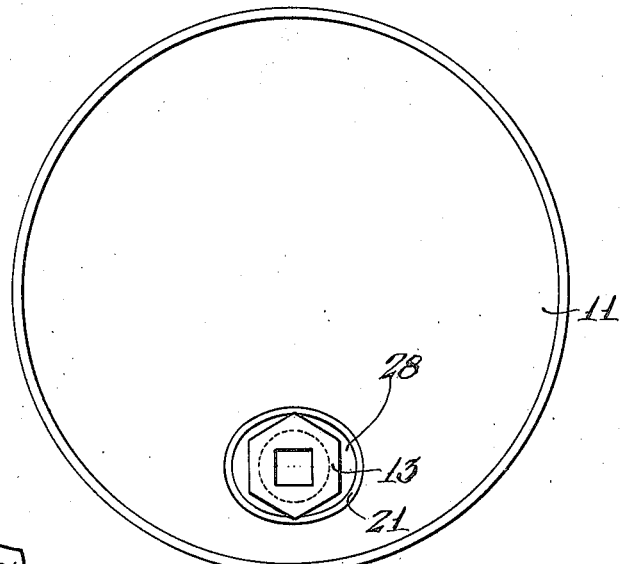
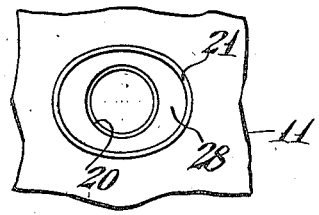
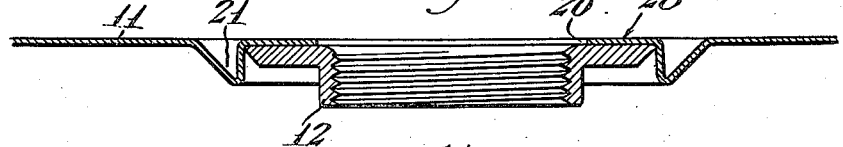
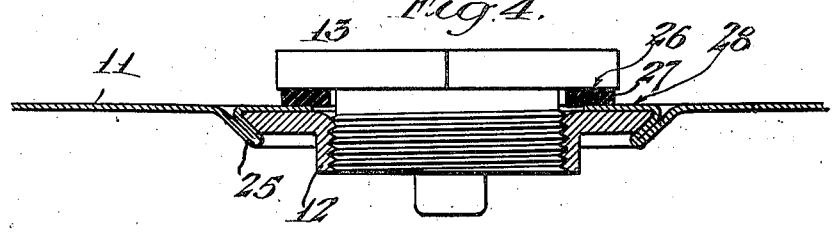
Inventor
William J. Boyle
Edward W. Poe
by Graham + ?
Attorneys Patented Dec. 2, 1924.

1,517,530

UNITED STATES PATENT OFFICE.

WILLIS J. BOYLE AND EDWARD W. ROE, OF LOS ANGELES, CALIFORNIA.

BUNGHOLE CONSTRUCTION FOR OIL BARRELS.

Application filed March 23, 1921. Serial No. 454,676.

*To all whom it may concern:*

Be it known that we, WILLIS J. BOYLE and EDWARD W. ROE, both citizens of the United States, residing at Los Angeles, in the county of Los Angeles and State of California, have invented a new and useful Improvement in Bunghole Constructions for Oil Barrels, of which the following is a specification.

The object of our invention is to provide a new type of construction in bung holes for metal barrels or tanks and the like. Such barrels or tanks are ordinarily formed of sheet metal which is comparatively thin and it is necessary to provide a reinforced opening in which a bung, or stopper may be screwed.

It has been common practice in the art to weld a metal member to the sheet metal, this memper being threaded to receive a metal bung, but such welded members are unsatisfactory due to the expense of welding them and the great liability for leaks to develop therearound.

The principal object of our invention is to provide a construction which will be extremely cheap, which will be very strong, and which will be liquid tight under all conditions.

Referring to the drawings which are for illustrative purposes only,

Fig. 1 is an end view of a barrel or the like equipped with my invention and with the stopper in place.

Fig. 2 is a similar view of a portion thereof showing the stopper removed.

Fig. 3 is a view showing the threaded member in place before the final crimping operation, and, Fig. 4 is a similar section showing the completed installation.

In the form of the invention shown, 11 is the head of the barrel, 12 is the reinforcing member for receiving the bung, and 13 is the threaded bung. We first form in the head of the barrel an opening 20 which is surrounded by a ridge 21, the space inside this ridge being preferably oval or elliptical in shape. The threaded member 12 is then placed as shown in Fig. 3 inside the raised ridge 21, the threaded member 12 being also elliptical and fitting tightly inside the ridge 21. After the threaded member is in place, the ridge 21 is crimped down as shown at 25 in Fig. 4 holding the threaded member 12 securely in place. By making the member 12 oval in shape it is held against turning as the bung 13 is screwed in and out. The bung 13 is provided with a shoulder 26 and with a gasket 27. It should be noted that the gasket 27 rests against the metal ring shown at 28 from which the head of the barrel is constructed outside the opening 20 so that when the bung 26 is screwed down, it presses this gasket against this original head thus making a water tight closure regardless of the tightness with which the member 25 fits about the member 12.

It has previously been the practice to form a hole in the head of the barrel and to then weld the member 12 to the head of the barrel over this hole. This has usually been done with an oxy-acetylene torch and has been an expensive operation due to its requiring considerable time of a skilled operator and due also to the gas used. It has also been unsatisfactory as leaks have often developed in such welds. By substituting a power press operation, we not only make very considerable saving but we also insure a uniformity not possible where hand work is used.

While our invention has a special utility as applied to barrels, it may be also applied to any sort of sheet metal construction and we do not wish it to be understood that we limit ourselves to the use in a barrel nor to any particular location in the head or other walls of such a barrel or container.

We claim as our invention:

1. In a container having a wall formed of sheet metal, a bung hole construction comprising: an oval member having a flange formed thereon; a ridge of metal formed from the sheet metal of said wall and extending into the container, said ridge being so formed as to extend over said flange; and a ring formed from the sheet metal of said wall, said ring extending outside said flange and being in the same plane as the remainder of said wall.

2. In a container having a wall formed of sheet metal, a bung hole construction comprising: a noncircular member having a flange formed thereon; a ridge of metal formed from the sheet metal of said wall and extending into the container, said ridge being so formed as to extend over said flange; and a ring formed from the sheet metal of said wall, said ring extending outside said flange and being in the same plane as the remainder of said wall.

3. In a container having a wall formed of sheet metal, a method of securing therein a reinforcing member threaded to receive a bung comprising: forming a ridge from the sheet metal wall of said container, said ridge having an internal diameter slightly larger than the greatest outside diameter of said reinforcing member, the wall of said container extending inwardly from said ridge to form a shoulder; seating the reinforcing member against said shoulder inside said ridge; and crimping said ridge over said member to hold it in place against said shoulder.

4. In a container having a wall formed of sheet metal, a method of securing therein a reinforcing member threaded to receive a bung, comprising: forming a ridge from the sheet metal wall of said container, said ridge being of such a size that a portion of said reinforcing member can be inserted therein, the wall of said container extending from said ridge towards the axis of said bung to form a shoulder; inserting said member in said ridge against said shoulder; and crimping said ridge down over the portion of said member, so inserted, to hold said member against said shoulder.

In testimony whereof, we have hereunto set our hands and seals at Los Angeles, California, this 5th day of March, 1921.

WILLIS J. BOYLE.
EDWARD W. ROE.